United States Patent [19]

Iquchi et al.

[11] Patent Number: 4,829,518
[45] Date of Patent: May 9, 1989

[54] MULTIPLEXING APPARATUS HAVING BSI-CODE PROCESSING AND BIT INTERLEAVE FUNCTIONS

[75] Inventors: Kazuo Iquchi, Yokohama; Tetsuo Soejima, Tama; Kazuo Murano, Tokyo, all of Japan

[73] Assignee: Fujitsu Limited, Kawasaki, Japan

[21] Appl. No.: 173,540

[22] Filed: Mar. 25, 1988

[30] Foreign Application Priority Data

Mar. 25, 1987 [JP]   Japan ................................. 62-71150

[51] Int. Cl.⁴ ............................ H04J 3/06; H04J 3/04
[52] U.S. Cl. .................................... 370/100; 370/102; 370/112
[58] Field of Search .................... 370/100, 102, 112; 371/46

[56]           References Cited
        U.S. PATENT DOCUMENTS

| | | | |
|---|---|---|---|
| 4,477,900 | 10/1984 | Gruenberg | 370/112 |
| 4,520,480 | 5/1985 | Kawai | 370/100 |
| 4,535,451 | 8/1985 | Drupsteen | 370/102 |
| 4,667,324 | 3/1987 | Graves | 370/102 |
| 4,709,227 | 11/1987 | Guerillot | 370/102 |
| 4,759,018 | 7/1988 | Buchner | 370/112 |

OTHER PUBLICATIONS

A study of Synchronous Multiplexing Scheme with BSI Transmission Code, by Kazuo Iguchi et al., National Conference Record 1986 Communications, the Institute of Electronics and Communication Engineers of Japan Part 2.

Primary Examiner—Robert L. Griffin
Assistant Examiner—Wellington Chin
Attorney, Agent, or Firm—Staas & Halsey

[57]           ABSTRACT

A multiplexing apparatus of a bit interleave type for time-division multiplex on PCM signals of a plurality of channels bit by bit to convert the PCM signals into a high-speed PCM signal. To maintain the advantage of the synchronous multiplex system, the multiplexing apparatus has a BSI-code processing function and a bit interleave function and comprises: a BSI-code adding circuit for adding BSI codes to the PCM signals before multiplexing; a BSI-code position shifting means circuit for shifting the positions of the BSI codes in the PCM signals to different positions respectively with respect to the PCM signals of a plurality of channels; and a multiplexing circuit for multiplexing the outputs of the BSI-code position shifting circuit by a bit-interleave mode.

20 Claims, 7 Drawing Sheets

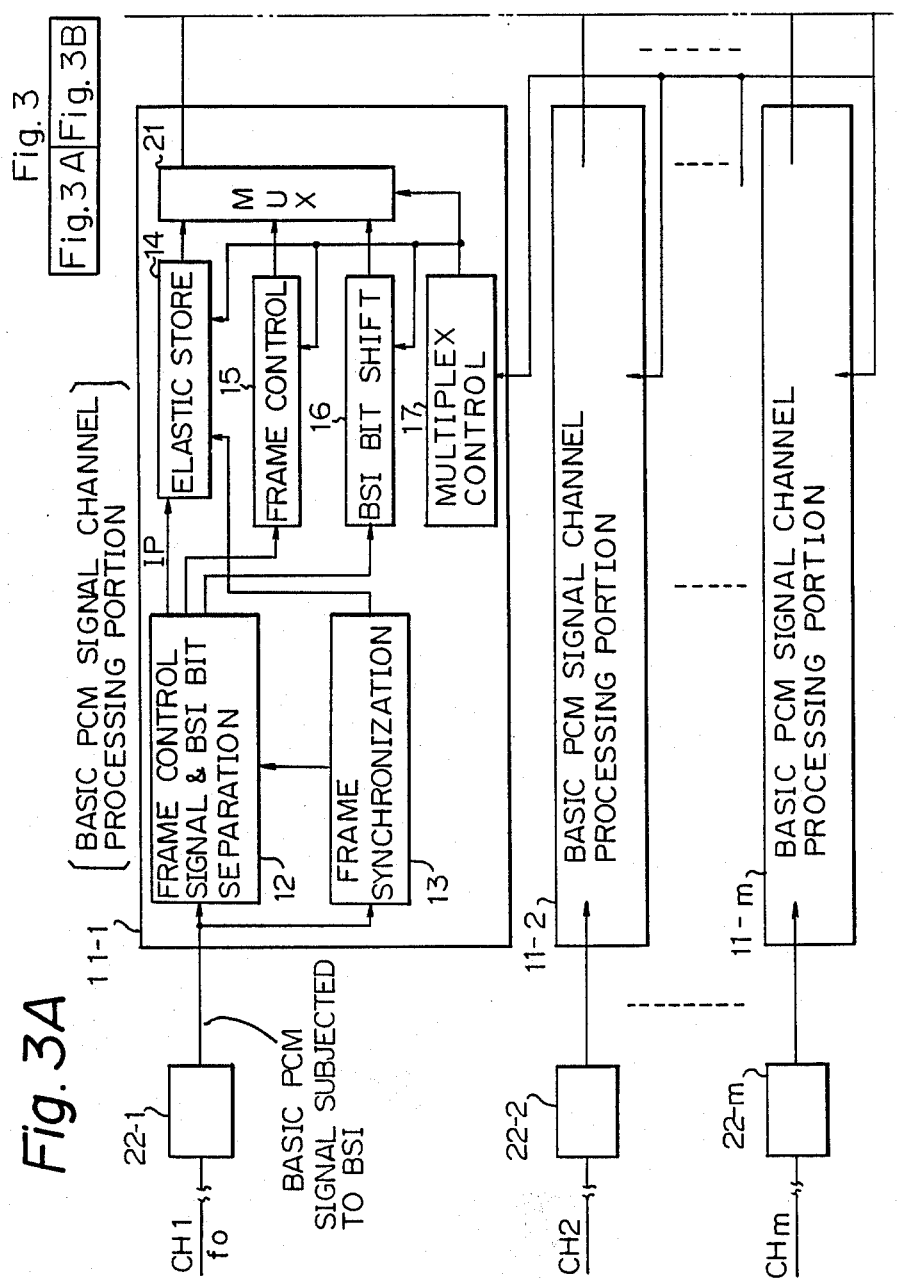

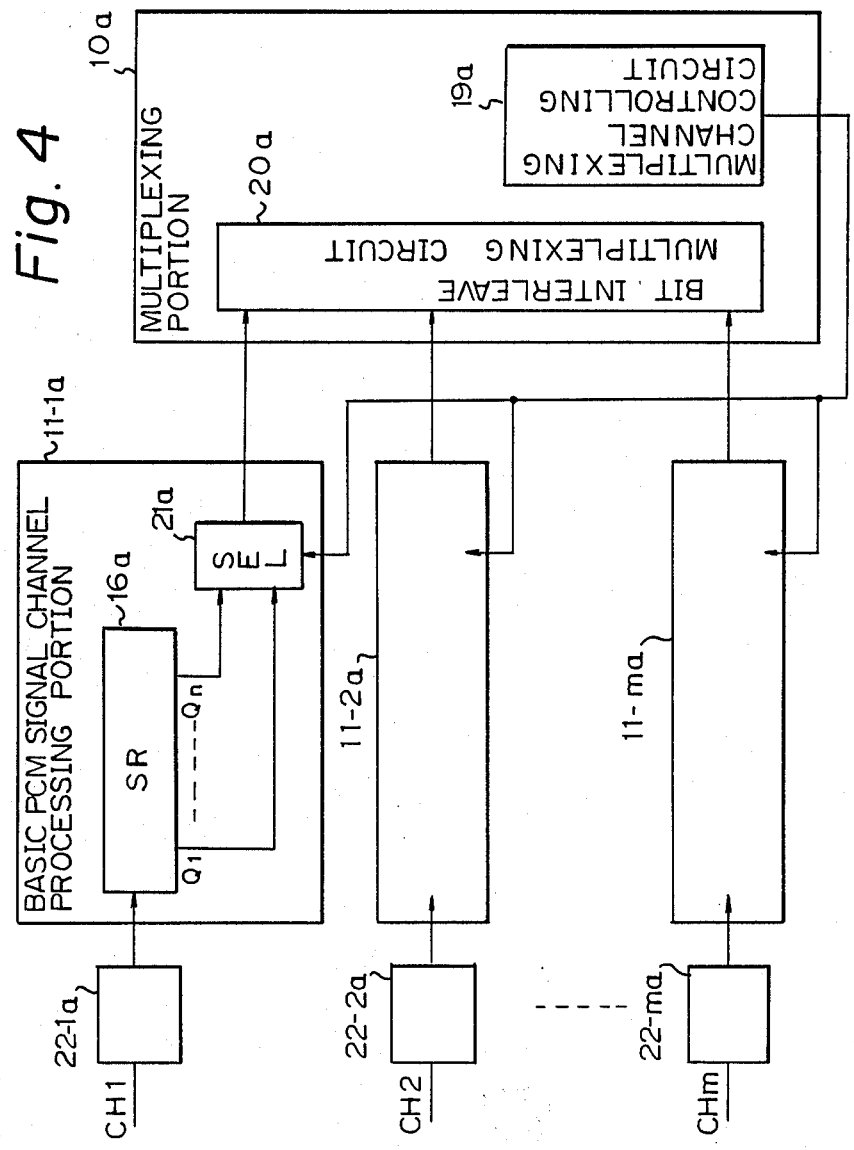

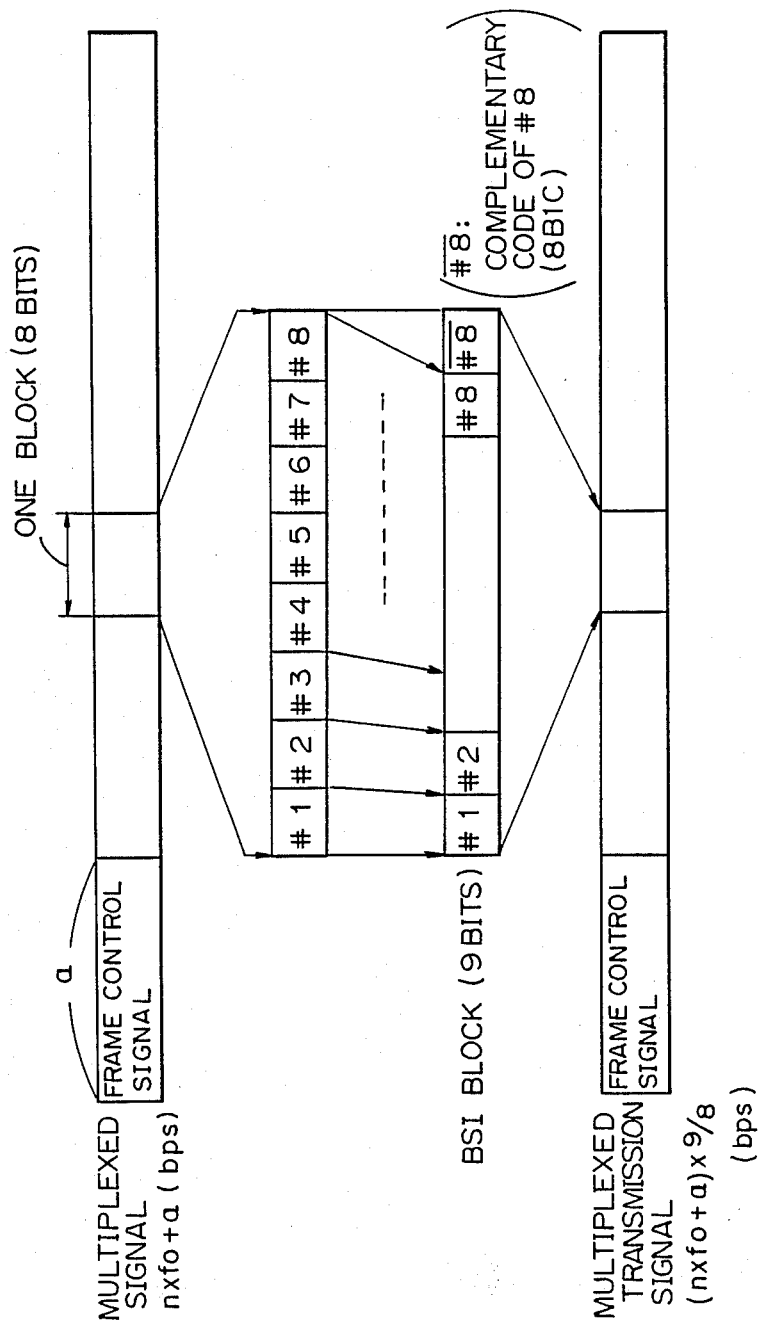

MULTIPLEXING APPARATUS HAVING BSI-CODE PROCESSING AND BIT INTERLEAVE FUNCTIONS

BACKGROUND OF THE INVENTION

1. Field of the Invention

The present invention relates to a multiplexing apparatus having a BSI-code processing function and a bit interleave function.

In a digital transmission system using optical fibers, etc., a reliable transmission of all kinds of information signals must be guaranteed. To ensure this transmission reliability, a Clear Channel Capability is required in which timing clock signals can be stably extracted from the input information signals without generating code errors, even when the input information signals include consecutive "0"s or "1"s, i.e., direct current components. To realize the Clear Channel Capability, the codes on transmission lines must be bit-sequence independent (BSI).

On the other hand, in a time division multiplex system, a digital hierarchy including many groups from the lowest-order group to the highest-order group has been developed. In addition, attempts have been made to develop a synchronous multiplex system which can realize a multiplex transmission without inserting, at each multiplexing process in each multiplexing circuit in each group, control signals such as frame synchronous signals, so that the increase of the transmission speed due to the insertion of the control signals is not caused after each multiplexing process. By this system, the transmission speed in each multiplexing circuit is, therefore, an integer multiple of a basic PCM signal speed, and thus in each multiplexing circuit, signal processing can be carried out only under the control of the basic clock signal.

To realize the above described synchronous multiplex system, PCM signals having a basic signal transmission speed are given with frame structures provided with multiplexing control signals such as frame synchronous signals and channel numbers of channels to be multiplexed. By this frame structure, the signal speed after the multiplexing is made an integer multiple of the basic PCM signal speed. Thus, a synchronous multiplexing system, which is different from conventional stuffing, is realized. The synchronous multiplexing technique, however, has been devised while taking only the multiplexing system into account, and, therefore, is not satisfactory as a transmission system with the clear channel capability. Namely, no consideration has been given in the synchronous multiplexing system to realizing the BSI of transmission line codes. Therefore, there is a need for a constitution which takes into account the BSI of the transmission system as well as the synchronous multiplexing system.

2. Description of the Related Art

Conventionally, the BSI process of digital transmission codes is realized in a transmission terminal equipment, and a time division multiplexing process, etc., is usually carried out in a multiplexing unit. For this, a signal speed of the PCM hierarchy is used as an interfacing speed between the time division multiplexing process and the transmission terminal equipment. Accordingly, the transmission terminal equipment which receives multiplexed PCM signals must carry out a speed conversion of the PCM signals by executing the BSI process such as an 8B1C (8th-bit one-complement by which one block becomes 9 bits) or a 5B6B (5th-bit 6-bit by which one block becomes 6 bits) and transmit the speed-converted signals to a transmission line. Further, at a receiving station, the signals are subjected to a reverse BSI process, a speed conversion process and a demodulating process, and transmitted to a multiplex converter. In this way, the BSI process is executed within the transmission terminal equipment, as later described in more detail with reference to the drawings.

As described above, in a conventional digital multiplex transmission system, the multiplexing system and the transmission system (BSI, etc.,) are provided separately. Therefore, even if a frame constitution which is adequate for the multiplexing system is adopted, that is, even if information signals with a basic PCM signal speed are provided in advance with a frame constitution to which control signals such as frame synchronous signals and channel numbers of channels to be multiplexed are added for the synchronous multiplexing and demultiplexing processes, the transmission terminal equipment treats these control signals and frame synchronous signals only as information signals. The conventional BSI process, such as a BSI bit insertion and removal, necessary for the transmission system, is carried out in each transmission terminal equipment. Therefore, in each transmission equipment, the multiplexed signal having a regularized speed of, for example, an integer multiple of the basic PCM signal speed, must be converted into a signal with the BSI having an increased speed. Because of the speed conversion, the advantage of the multiplexing system of the digital hierarchy utilizing the basic PCM signal speed is lost in the transmission equipment. Further, due to the necessity of the speed conversion, the hardware scale of the transmission equipment becomes large and expensive.

SUMMARY OF THE INVENTION

An object of the present invention is to provide a multiplexing apparatus having a BSI-code processing function and a bit interleave function in which the advantage of the synchronous multiplex system is maintained.

Another object of the present invention is to provide the above multiplexing apparatus in which each unit has no speed conversion part.

Still another object of the present invention is to provide the above multiplexing apparatus in which a small-scale transmission equipment is provided.

A still further object of the present invention is to provide the above multiplexing apparatus in which the transmission equipment is provided at a low cost.

To attain the above objects, there is provided, according to the present invention, a multiplexing apparatus of a bit interleave type for time-division multiplex on PCM signals of a plurality of channels bit by bit to convert said PCM signals into a high-speed PCM signal. The multiplexing apparatus has a BSI-code processing function and a bit interleave function, and comprises: a BSI-code adding means for adding BSI codes to the PCM signals before multiplexing; a BSI-code position shifting means for shifting the positions of the BSI codes in the PCM signals to different positions respectively with respect to the PCM signals of a plurality of channels; and a multiplexing means for multiplexing the outputs of the BSI-code position shifting means by a bit-interleave mode.

According to another aspect of the present invention, there is provided a multiplexing apparatus of a bit interleave type for time-division multiplex on PCM signals of a plurality of channels bit by bit to convert the PCM signals into a high-speed PCM signal; the multiplexing apparatus having a BSI-code processing function and a bit interleave function, BSI bits being inserted into each predetermined block of input PCM signals in advance, and comprising: basic PCM signal channel processing portion each for shifting positions of said BSI bits of said respective channels and for multiplexing the shifted bits with the PCM signals of corresponding channel.

The outputs of the basic PCM signal channel processing portions are multiplexed under a bit interleave mode. The multiplexed signals are inverted at the BSI bits.

According to still another aspect of the present invention, there is provided a multiplexing apparatus of a bit interleave type for time-division multiplex on PCM signals of a plurality of channels bit by bit to convert the PCM signals into a high-speed PCM signal, the multiplexing apparatus having a BSI-code processing function and a bit interleave function, and comprising: a BSI-code adding means for adding BSI codes to the PCM signals before multiplexing; a basic PCM signal channel processing means; and a multiplexing portion.

The basic PCM signal channel processing means includes separating means for separating a frame control signal, a BSI code, and data, included in each frame of the input PCM signals; a memory for temporarily buffering the data; frame control means changing the channel number in the frame control signal; BSI-code shifting means for shifting the BSI code; multiplexing means for multiplexing data read from the memory, the frame control signal, and the BSI code; and a multiplexing portion comprising bit interleave multiplexing means for multiplexing a bit sequence input from the PCM signals of a plurality of channels.

BRIEF DESCRIPTION OF THE DRAWINGS

The above objects and features of the present invention will be more clearly understood from the following description of the preferred embodiments with reference to the drawings wherein:

FIG. 4 is a view showing the constitution of another embodiment of the present invention;

FIG. 7 is a view showing an example of a frame constitution subjected to a BSI process.

DESCRIPTION OF THE PREFERRED EMBODIMENTS

For a better understanding of the present invention, a conventional BSI bit interleave multiplex system will first be described with reference to FIGS. 6 and 7.

Figure 6:
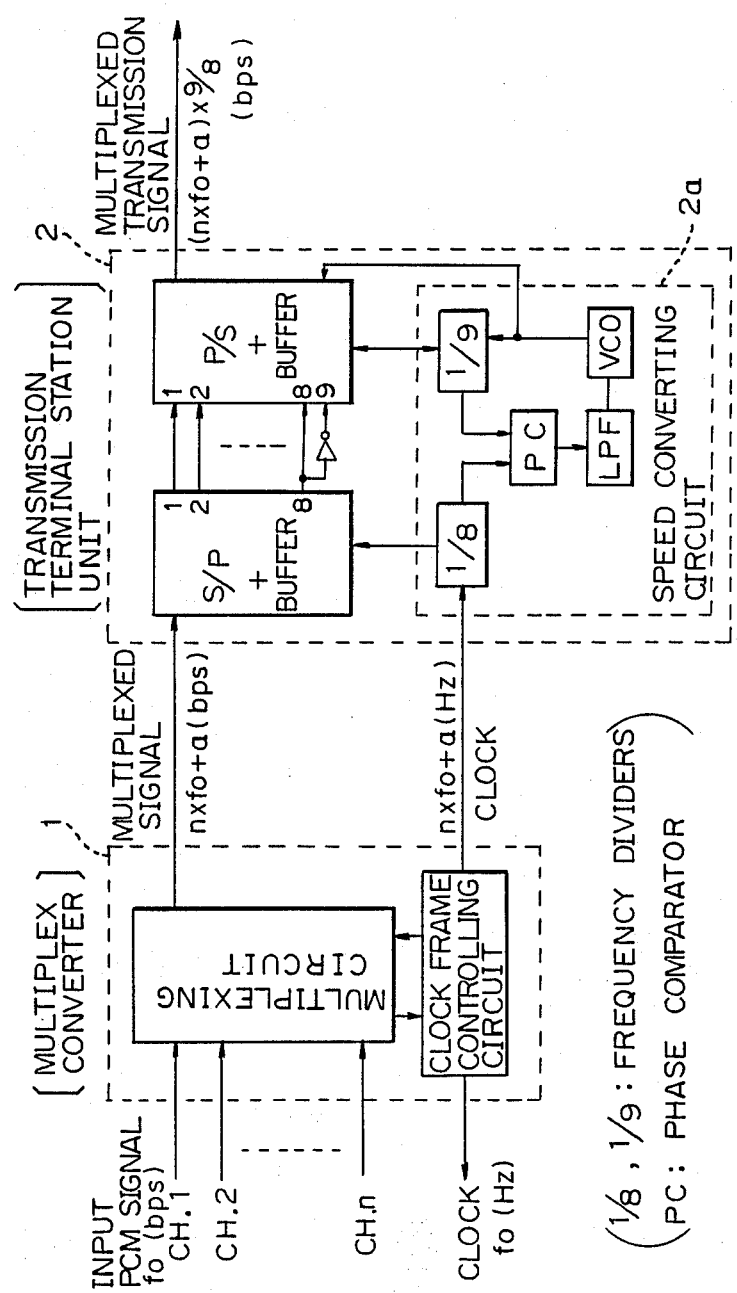
FIG. 6 is a view showing the constitution of a prior art.

FIG. 6 is a block diagram showing a conventional BSI bit interleave multiplex system.

In the figure, 1 represents a multiplex converter, and 2 represents a transmission terminal equipment. The multiplex converter 1 multiplexes input signals CH1 to CHn of "n" channels to supply a signal of $(n \times fo + a)$ bps to the transmission terminal equipment 2, and further, supplies a clock of $(n \times fo + a)$ Hz corresponding to the signal. The "a" bits are those allocated for a frame control signal in each frame. In the transmission terminal equipment 2, the multiplexed signal is subjected to a serial/parallel (S/P) conversion, a buffering, and a parallel/serial (P/S) conversion and output. During this process, by using a speed converting circuit 2a having a PLL circuit, a block of 8 bits is converted into a block of 9 bits by inserting a BSI bit.

FIG. 7 is a view showing the converting process to the 9 bits. The multiplexed signal is divided into segments each having 8 bits. For example, an 8th bit #8 in one block is inverted to $\overline{\#8}$ and added to the block. The signal is then sent as a multiplexed transmission signal.

With the constitution shown in FIG. 6, a speed of the transmission signal is increased due to the insertion of the BSI. Therefore, the advantage of the synchronous multiplexing system, that is, the transmission speed after the multiplexing becomes an integer multiple of the basic PCM signal speed so that the interface speed and multiplexing unit are simplified, is not effectively utilized in the conventional transmission equipment.

Now, embodiments of the present invention will be described.

Figure 1:
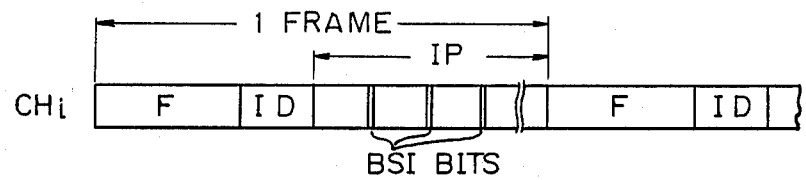
FIG. 1 is a view showing a data format of a PCM channel utilized in the present invention.

FIG. 1 is a view showing a data format of a PCM channel which is utilized in a multiplexing apparatus according to the present invention. In the figure, a PCM signal of a channel CHi before multiplexing includes a sequence of frames each consisting of a frame synchronizing signal F, a channel number ID, and an information payload (data) IP. In the information payload IP, a BSI bit is inserted after, for example, each 8-th bit of one block, as shown in FIG. 2.

Figure 2:
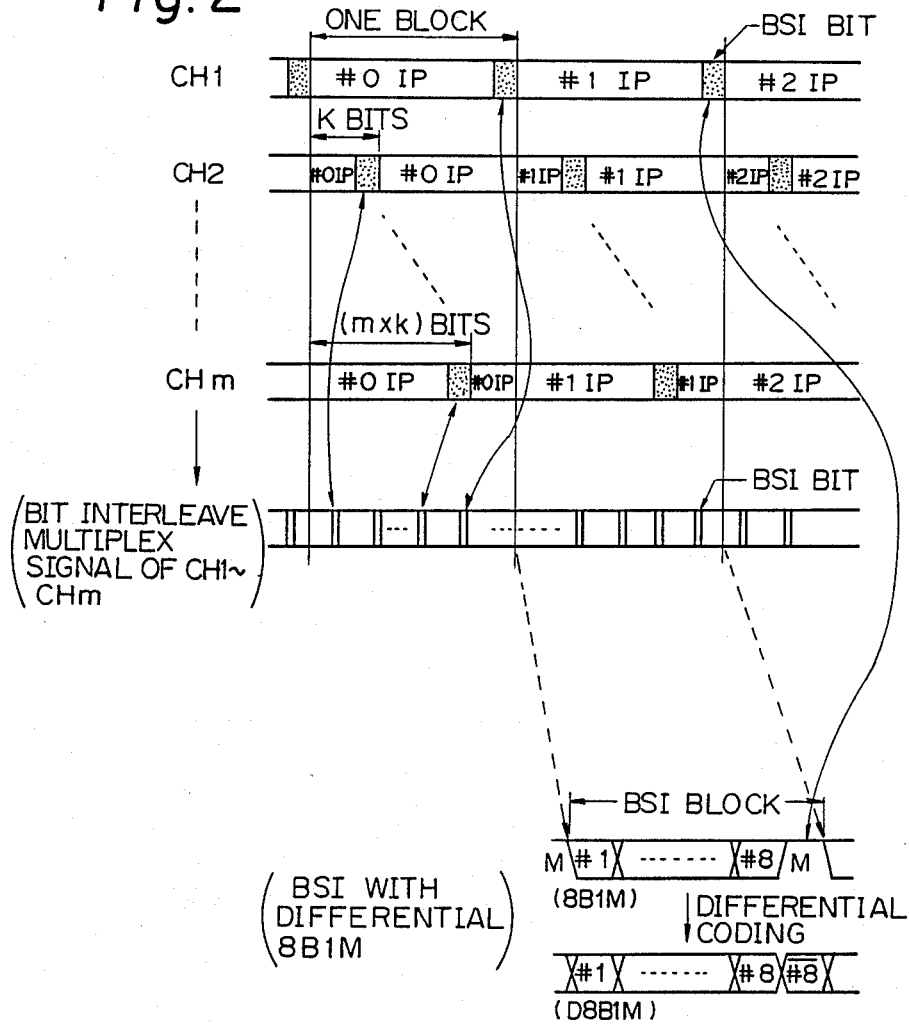
FIG. 2 is an explanatory view showing a principle of the present invention.

FIG. 2 is an explanatory view showing the principle of the present invention. In the figure, information payload IP in each channel is divided into a number of blocks. A BSI bit is added to, for example, each block in each of the channels CH1 to CHm before multiplexing. The BSI bits may be added before input to the multiplexing apparatus. Alternatively, the BSI bits may be added at the input stage of the multiplexing apparatus. After adding the BSI bits, each BSI bit in a channel CHi is shifted by "i×k" bits from the originally added position. For example, each BSI bit in the channel CH2 is shifted by "k" bits. Also, each BSI bit in the channel CHm is shifted by "m×k" bits. Alternatively, each block including a BSI bit may be entirely shifted by k bits. This alternative method, however, causes a delay of the information payload, i.e., data, by k bits, and it is preferable not to delay the information payload. To cope with this, in the figure, the information payload (IP) is not delayed but only the BSI bits are delayed by K bits. Note, the positions of the shifted BSI bits are determined by the channel numbers and the predetermined number "k". The shift of the BSI bits is necessary in order to avoid a continuous series of BSI bits after multiplexing. Since the positions of the BSI bits shifted in each channel can be identified by counting the bit length from the frame control signal in the channel, phases of blocks of the respective channels need not be aligned, although they are aligned in the figure for easy understanding.

The channels CH1 to CHm with the shifted BSI bits are then multiplexed by a bit interleave method.

As the BSI bit, a differential 8B1M (8-bit one mark) as illustrated in the figure is used as an example By the differential 8B1M (D8B1M), a mark M is added to a position corresponding to a 9th bit in each block, and when the mark M is found by a receiver, a bit #8 is inverted to #8', and inserted into the 9th bit. Thus, a new one block consisting of nine bits #1, . . . #8, is formed. The D.C. components in the PCM signals, can be removed by the differential coding.

In place of the D8B1M, 8B1C may be alternatively used as the BSI bit. By the 8B1C, the 9th bit in each block is always an inverted signal of the 8th bit. Therefore, after multiplexing of m channels, an inverted signal appears in at longest m×k bits so that the BSI is satisfied, although it is not sufficient.

In operation, basic PCM signals are made to have BSI bits when their frames are formed. To multiplex the basic PCM signals with the BSI bits, positions of the BSI bits are shifted according to channel numbers of channels to be multiplexed. Therefore, the BSI bit inserting process can be realized without processing high-speed PCM signals after multiplexing. As a result, the transmission equipment can be simplified and realized in compact sizes while satisfying features of the synchronous multiplex system. Accordingly, clocks in a transmission switching network can be simplified, and multiplexing circuits can be formed in modules so as to reduce the cost.

Figure 3B:
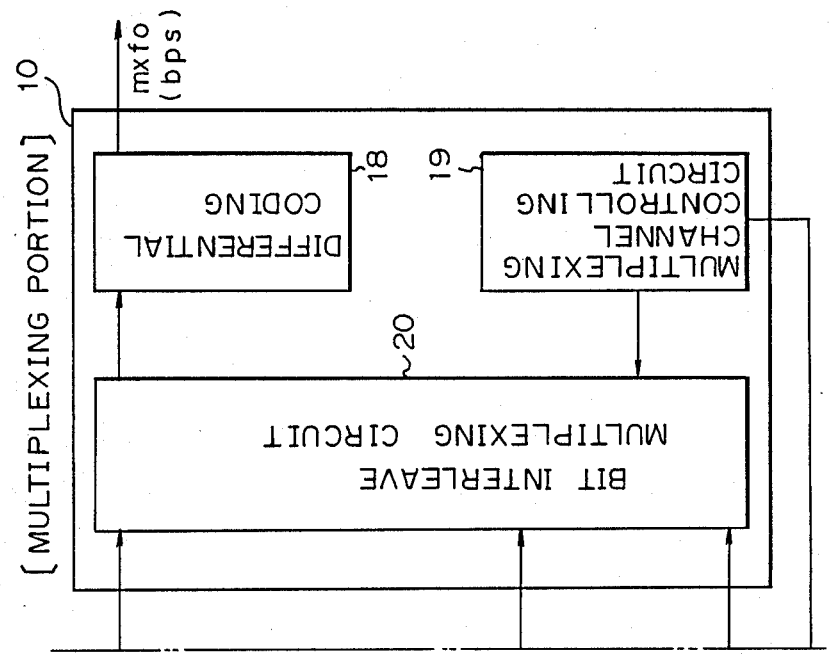
FIG. 3 is a view showing the constitution of an embodiment of the present invention.

FIG. 3 is a block diagram showing the constitution of a multiplexing apparatus according to an embodiment of the present invention. In the figure, a reference numeral 10 represents a multiplexing portion corresponding to the conventional multiplex converter 1 shown in FIG. 6. Reference numerals 11-1, 11-2, . . . 11-m represent basic PCM signal channel processing portions provided to correspond to respective channels for carrying out a preparatory process corresponding to the multiplexing process shown in FIG. 1. A numeral 12 represents a frame control signal and BSI bit separating portion which separates information signals (IP), frame control signals and BSI bits one from another. A numeral 13 represents a frame synchronization portion for effecting frame synchronization of input signals and generating timing signals necessary for respective circuits. A numeral 14 represents an elastic store for adjusting a time for writing or reading information signals. A numeral 15 is a frame controlling portion for updating multiplexing overheads of, for example, channel numbers of channels to be multiplexed included in the frame control signals. A numeral 16 is a BSI bit shifting portion for shifting positions of BSI bits so as to satisfy the condition that each block in each channel includes at least one BSI bit after multiplexing. A numeral 17 is a multiplexing controlling portion for generating frame signals and providing phase adjusting instructions with respect to multiplexing reference phases, according to instructions from a multiplexing channel controlling circuit 19. A numeral 18 is a differential coding portion for differential-coding ("1": inverting data; "0": holding data of a previous time slot) multiplexed signals from the respective channel processing portions (11-1 to 11-m). A numeral 19 is the multiplexing channel controlling circuit for generating reference frames necessary for the multiplexing process and instructing channel numbers of the respective channel processing portions. A numeral 20 is a bit interleave multiplexing circuit for performing a bit interleave multiplexing.

Numerals 22-1, 22-2, . . . , and 22-m are BSI-code adding circuits for adding BSI codes to the input basic PCM signals.

In operation, a basic PCM signal of each channel is subject to BSI process in the BSI-code adding circuit 22-1, 22-2, . . . or 22-m. The basic PCM signal after the BSI process is input to the frame control signal and BSI bit separating portion 12 wherein frame control signals and BSI bits are separated from the PCM signal (information payload) and input to the frame controlling portion 15 and the BSI bit shifting portion 16, respectively. Information payloads (data) are input to the elastic store 14. In the BSI bit shifting portion 16, the BSI bits are shifted in advance so that a transmission signal may have the BSI characteristic. According to a control signal from the multiplexing channel controlling circuit 19, the multiplexing controlling portion 17 generates frame signals and provided instructions with respect to multiplexing phases. Accordingly, the multiplexing circuit 21 multiplexes the data, frame signals and BSI bits.

Signals of respective channels multiplexed in this way are input to the bit interleave multiplexing circuit 20 in which the signals are multiplexed for each bit under a bit interleave mode. The multiplexed signals are differential-coded in the differential-coding portion 18 and transmitted.

The BSI-code adding circuits 22-1 to 22-m at the input stage of the multiplexing apparatus as shown in FIG. 3 may be omitted and the BSI bits may be added at a transmitting side (not shown in the figure). In this case, the BSI bits are already included in the input basic PCM signals.

FIG. 4 shows another embodiment of the present invention. In the figure, the multiplexing apparatus according to the another embodiment of the invention includes BSI-code adding circuits 22-1a, 22-2a, . . . and 22-ma, basic signal channel processing portions 11-1a, 11-2a, . . . , and 11-ma, and a multiplexing portion 10a. The BSI-code adding circuits 22-1a, 22-2a, . . . and 22-ma are the same as those of FIG. 3. Each of the basic signal channel processing portions 11-1a, 11-2a, . . . , and 11-ma includes a shift register (SR) 16a and a selector (SEL) 21a. The multiplexing portion 10a includes a bit interleave multiplexing circuit 20a and a multiplexing channel controlling circuit 19a. The selectors (SEL) 21a are controlled by the multiplexing channel controlling circuit 19a.

In operation, the basic PCM signal in each channel after the BSI processing by the corresponding BSI-code adding circuit is shifted bit by bit in the shift register 16a. Then, the selector (SEL) 21a selects, under the control of the multiplexing controlling circuit 19a, the necessary outputs from the outputs Q1 to Qn of the register 16a. A one block of, for example, 9 bits is selected at one time. The selected block is determined in accordance with the channel number. Thus, at the output of the selector 21a the entirely shifted PCM signal of one block is obtained and the shifted value is determined in accordance with the channel number. The outputs of the selectors 21a in all of the basic PCM signal processing portions 11-1a to 11-ma are multiplexed under the bit interleave made by the bit interleave multiplexing circuit 20a. The multiplexed signal is output to the outgoing line.

According to the above embodiment, not only the BSI bit but also the information payload is shifted. It is not difficult to discriminate the information payload by providing a necessary discriminating circuit, although it is not preferable to shift the information payload. In this embodiment also, since the BSI bits are shifted before multiplexing, the effect of the present invention is also obtained.

Figure 5:
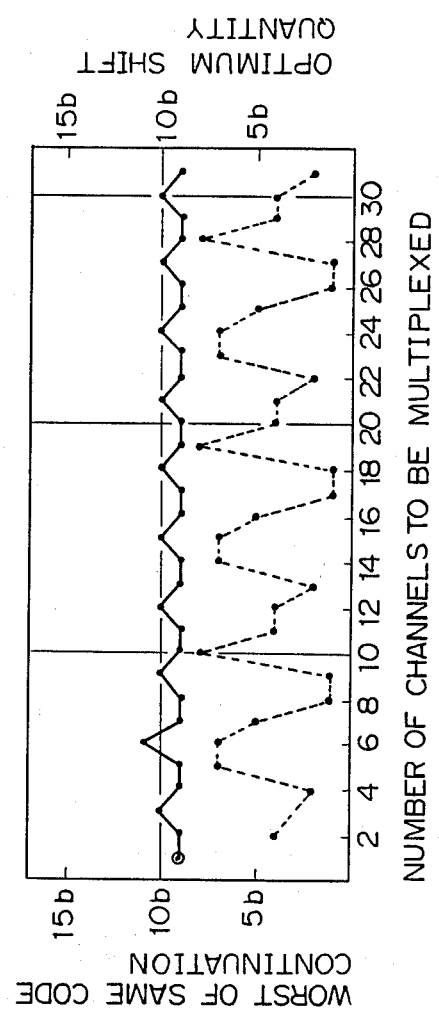
FIG. 5 is an explanatory view showing an effect of the present invention.

FIG. 5 is an explanatory view showing an experimental effect of the differential 8B1M used for the BSI process. In the figure, an abscissa represents the number of channels to be multiplexed, and a dotted line showing how to select, according to the number of channels, the shifting quantity "k" explained with reference to FIG. 2. A continuous line shows, in the worst case, how many bits of the same codes continue with respect to a given optimum shift value "k". Naturally, the BSI bits are inserted to prevent the same code from appearing consecutively.

As will be understood from FIG. 5, the same codes continue only between 9 bits and 11 bits, when the shift value "k" is selected as shown in the dotted curve.

From the foregoing description, it will be apparent that, according to the present invention, since basic PCM signals have BSI characteristics with no further processes on high-speed PCM signals after multiplication, the transmission equipment can be simplified and the size thereof minimized. Further, the features of a synchronous multiplexing system can be simultaneously provided in a satisfactory manner. In addition, clocks of a transmission switching network can be simplified, and multiplexing circuits can be formed in modules to reduce the cost.

We claim:

1. A multiplexing apparatus of a bit interleave type for time-division multiplex on PCM signals of a plurality of channels bit by bit to convert said PCM signals into a high-speed PCM signal, said multiplexing apparatus having a BSI-code processing function and a bit interleave function, comprising:
   a BSI-code adding means for adding BSI codes to said PCM signals before multiplexing;
   a BSI-code position shifting means for shifting the positions of said BSI codes in said PCM signals to different positions respectively with respect to said PCM signals of a plurality of channels; and
   a multiplexing means for multiplexing the outputs of said BSI-code position shifting means by a bit-interleave mode.

2. A multiplexing apparatus as set forth in claim 1, wherein said BSI-code position shifting means shifts said positions of said BSI codes in accordance with the numbers of said plurality of channels, respectively.

3. A multiplexing apparatus as set forth in claim 1, wherein each of said PCM signals comprises a plurality of blocks, and said BSI-code position shifting means shifts only said positions of said BSI codes in said respective blocks in accordance with the numbers of said plurality of channels, respectively.

4. A multiplexing apparatus as set forth in claim 1, wherein each of said PCM signals comprises a plurality of blocks, and said BSI-code position shifting means shifts each of said blocks entirely by a predetermined value in accordance with the number of said plurality of channels, respectively.

5. A multiplexing apparatus as set forth in claim 1, wherein, in said BSI-code position shifting means, the shift values of said BSI codes are determined as integer multiples for respective channels in accordance with the numbers of said plurality of channels, respectively, and the shift values are determined to be different for different channels.

6. A multiplexing apparatus as set forth in claim 5, wherein said shift values are determined to be integer multiples of said channel numbers in said PCM signals of a plurality of channels.

7. A multiplexing apparatus as set forth in claim 1, wherein said BSI-code adding means utilizes a differential 8B1M.

8. A multiplexing apparatus as set forth in claim 1, wherein said BSI-code adding means utilizes an 8B1C.

9. A multiplexing apparatus as set forth in claim 1, wherein said BSI-code adding means utilizes BSI codes already included in the input PCM signals.

10. A multiplexing apparatus as set forth in claim 1, wherein said BSI-code adding means utilizes BSI codes generated in said multiplexing apparatus.

11. A multiplexing apparatus of a bit interleave type for time-division multiplex on PCM signals of a plurality of channels bit by bit to convert said PCM signals into a high-speed PCM signal, said multiplexing apparatus having a BSI-code processing function and a bit interleave function, BSI bits being inserted into each predetermined block of input PCM signals in advance, comprising:
   basic PCM signal channel processing portions each for shifting positions of said BSI bits of said respective channels and for multiplexing the shifted bits with the PCM signals of corresponding channel;
   the outputs of said basic PCM signal channel processing portions being multiplexed under a bit interleave mode; and
   the multiplexed signals being inverted at said BSI bits.

12. A multiplexing apparatus of a bit interleave type for time-division multiplex on PCM signals of a plurality of channels bit by bit to convert said PCM signals into a high-speed PCM signal, said multiplexing apparatus having a BSI-code processing function and a bit interleave function, comprising:
   a BSI-code adding means for adding BSI codes to said PCM signals before multiplexing;
   a basic PCM signal channel processing means; and
   a multiplexing portion;
   said basic PCM signal channel processing means including;
   separating means for separating a frame control signal, a BSI code, and data, included in each frame of the input PCM signals;
   a memory for temporarily buffering said data;
   frame control means for changing the channel number in said frame control signal;
   BSI-code shifting means for shifting said BSI code; and
   multiplexing means for multiplexing data read from said memory, said frame control signal, and said BSI code; and
   said multiplexing portion comprising:
   bit interleave multiplexing means for multiplexing a bit sequence input from said PCM signals of a plurality of channels.

13. A multiplexing apparatus as set forth in claim 12, wherein each of said PCM signals comprises a plurality of blocks, and said BSI-code position shifting means shifts only said positions of said BSI codes in said respective blocks in accordance with the numbers of said plurality of channels, respectively.

14. A multiplexing apparatus as set forth in claim 12, wherein each of said PCM signals comprises a plurality of blocks, and said BSI-code shifting means shifts each of said blocks entirely by a predetermined value in accordance with the numbers of said plurality of channels, respectively.

15. A multiplexing apparatus as set forth in claim 12, wherein, in said BSI-code position shifting means, the shift values of said BSI codes are determined as integer multiples for respective channels in accordance with the numbers of said plurality of channels, respectively, and the shift values are determined to be different for different channels.

16. A multiplexing apparatus as set forth in claim 15, wherein said shift values are determined to be integer multiples of said channel numbers in said PCM signals of a plurality of channels.

17. A multiplexing apparatus as set forth in claim 12, wherein said BSI-code adding means utilizes a differential 8B1M.

18. A multiplexing apparatus as set forth in claim 12, wherein said BSI-code adding means utilizes an 8B1C.

19. A multiplexing apparatus as set forth in claim 12, wherein said BSI-code adding means utilizes BSI codes already included in the input PCM signals.

20. A multiplexing apparatus as set forth in claim 12, wherein said BSI-code adding means utilizes BSI codes generated in said multiplexing apparatus.

* * * * *